United States Patent Office 3,825,554
Patented July 23, 1974

3,825,554
METHOD FOR PREPARING CYCLIC NITRILE CARBONATES
Emmett H. Burk, Jr., Glenwood, and Karl E. Fuger, Harvey, Ill., assignors to Atlantic Richfield Company, New York, N.Y.
No Drawing. Filed June 13, 1969, Ser. No. 833,195
Int. Cl. C07d 85/06
U.S. Cl. 260—307 A
13 Claims

ABSTRACT OF THE DISCLOSURE

A method for the preparation of cyclic nitrile carbonates having the formula:

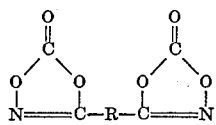

wherein R is hydrocarbon of 4 to about 12, or to about 20, carbon atoms by the reaction of an hydroxamic acid with phosgene is disclosed. The method of this invention employs a dual solvent system comprising a combination of alkaline aqueous and organic solvents to provide high yields of a relatively pure product.

---

The present invention relates to the formation of dioxazolones. More particularly, the invention relates to dioxazolones, or nitrile carbonates, formed by the reaction of phosgene with hydroxamic acids in a dual solvent system employing both organic and alkaline aqueous solvents to provide a suitable medium for dissolving the reactants and to obtain high yields of a relatively pure product.

The reaction of an hydroxamic acid with phosgene to form a nitrile carbonate is disclosed, for example, in U.S. Pat. 3,560,518 and U.S. patent application Ser. No. 713,997, filed Mar. 18, 1968, now U.S. Pat. 3,726,692, of Burk and Carlos, herein incorporated by reference. The reaction apparently proceeds according to the following equation:

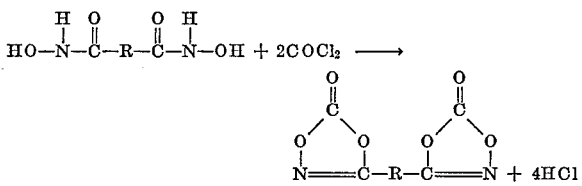

Thus, for each mole of di(nitrile carbonate) produced, four moles of hydrochloric acid are formed as a by-product. The hydrochloric acid must be removel from the system if the reaction is to proceed rapidly and completely. It has now been found that the use in the reaction of an alkaline aqueous medium in conjunction with an organic solvent is an effective means of neutralizing the hydrochloric acid while at the same time maintaining the organic medium necessary for a stable product. By the method of this invention, for example, an alkaline aqueous solution of a hydroxamic acid can be combined with a solution of phosgene in an inert organic solvent to produce nitrile carbonates. To minimize hydrolysis of phosgene and/or the nitrile carbonate product, and the consequent lowering of yield, the reaction mass should not be very basic. The reaction can thus be carried out by any method of addition which maintains the system at a pH no higher than about 8, preferably no higher than about 7.5 and ideally at a value of about 7. Generally, the pH of the system will not be below about 1, preferably not below about 6.5.

It is important in the method of the present invention that the reaction mixture be agitated, since the reaction apparently takes place at the interface of the organic and aqueous phases. The organic solvent employed in the method of this invention is a water-immiscible solvent in which the nitrile carbonate product is soluble at the reaction temperature. Preferably, it is one in which the phosgene is soluble as well. The solvent usually has up to about 8 carbon atoms, preferably up to about 6 carbon atoms. Suitable solvents include aromatic hydrocarbons, e.g. benzene, etc., and lower aliphatic chlorohydrocarbons such as carbon tetrachloride, chloroform and methylene chloride. The preferred solvent is benzene. The amount of organic solvent employed is at least sufficient to place the major amount of the desired nitrile carbonate product in solution and often is about 1 to 4 liters of solvent per mole of nitrile carbonate product. Advantageously, the amount of organic solvent is that which will maintain the reaction mass near its saturation point, based on the nitrile carbonate product, so that upon separation of the water from the system the product will crystallize upon slight cooling. Additional solvent may require flash evaporation of the excess solvent or a need for lower temperatures in order to crystallize the product. The product nitrile carbonate may precipitate from solution prior to separation of the organic and aqueous phases, for example during the course of the reaction. Recovery and purification of the nitrile carbonate product is generally facilitated, however, if the separation of the aqueous and organic phases precedes the separation of the product from its mother liquor. Accordingly, it is usually advantageous where such pre-precipitation occurs to add additional organic solvent to the reaction mixture or to warm the mixture, or both, so as to put the product back into solution prior to removal of the aqueous phase.

The molar amount of organic solvent employed is at least about as great as the molar amount of water in the system. The presence of greater than equimolar amounts of organic solvent may be advantageous in inhibiting undesirable side reactions between phosgene and water. The amount of water employed in the reaction is at least sufficient to maintain the major amount of the hydroxamic acid in solution. The presence of the base in the system enhances the solubilization of the acid. The use of large excesses of water is not desired since they only increase the size of the system as well as the possibility of reactions between phosgene and water. Thus, the amount of water employed is often about 25 to 50 moles of water per mole of hydroxamic acid.

The water phase is rendered alkaline by a water-soluble basic material that is non-reactive with the desired product and is effective to neutralize the hydrochloric acid formed. Preferred are the inorganic bases such as sodium hydroxide, potassium hydroxide and sodium carbonate, although water-soluble organic bases, such as triethylamine, can be used as well. Most preferred, for reasons of economy, is sodium hydroxide.

Temperatures employed in the reaction of this invention are often in the range of about —20° or below to about 50° C. For batch operation where contact times can be about 10 to 15 minutes or greater it is preferred that the temperature not exceed about 10° C. At higher temperatures undesirable side reactions may occur between the phosgene and the water. In continuous systems, however, contact time can be limited so that higher temperatures can be more readily employed without unduly increasing undesirable side reactions. At the lower reaction temperatures the hydroxamic acid is generally slow to dissolve and many even come out of solution, go back into solution, etc., during the reaction. Either the hydroxamic acid reactant or the phosgene reactant can be employed in excess but it is preferred that at least a stoichiometric amount of phosgene be used, that is, a ratio of at least one mole of phosgene per mole of hydroxamic acid substituent. An excess of phosgene, for instance at least about 5% over stoichiometric, is particularly preferred in order to insure that the reaction goes to completion. An excess of phosgene also helps to assure a relatively pure product. It is also preferred that the concentration of the phosgene in the organic solvent not exceed about 0.9 mole per liter of solvent.

The hydroxamic acids which can be used to produce cyclic nitrile carbonates by the process of the present invention include those represented by the structure:

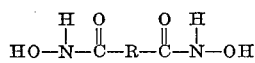

wherein R is aliphatic, cycloaliphatic or aromatic hydrocarbon, including mixed hydrocarbons of these types, saturated or unsaturated, having 4 to about 20, preferably up to about 12 carbon atoms. The hydroxamic acids can also have substituents which do not unduly deleteriously affect the desired reaction. The hydroxamic acids employed in this invention are characterized by the hydroxamic acid groups being separated from each other by at least 3, preferably at least 4, carbon atoms. In other words, there are at least 3, preferably at least 4, intervening carbon atoms between the carbonyl carbon atoms of the two hydroxamic acid groups.

The system of nomenclature employed herein for designating the hydroxamic acids is that wherein the hydroxamic acid is named as a derivative of the R group in the above structural formula. Thus, where R is butylene (i.e., —CH$_2$—CH$_2$—CH$_2$—CH$_2$—) then the acid has the structural formula:

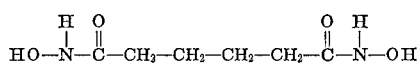

and is designated butane-1,4-dihydroxamic acid. The nitrile carbonates are likewise named as derivatives of their R groups. Thus, for example, the term "butane-1,4-di(nitrile carbonate)," as used herein, designates the cyclic nitrile carbonate having the structural formula:

Illustrative aliphatic dihydroxamic acids suitable for use as reactants in the preparation of aliphatic and cycloaliphatic di(nitrile carbonates) include the following: propane-1,3-dihydroxamic acid; butane - 1,4 - dihydroxamic acid; pentane-1,5-dihydroxamic acid; hexane-1,6-dihydroxamic acid; heptane-1,7-dihydroxamic acid; octane-1,8-dihydroxamic acid; cyclohexanedihydroxamic acids; etc. Illustrative examples of aliphatic di(nitrile carbonates) include those corresponding to the foregoing hydroxamic acids, such as propane-1,3-di(nitrilecarbonate); butane-1,4-di(nitrile carbonate); etc.

Illustrative aromatic dihydroxamic acids suitable for use as reactants in the preparation of the aromatic di(nitrile carbonates) include, for instance, benzene-1,3-dihydroxamic acid; benzene-1,4-dihydroxamic acid; dialkylbenzenedihydroxamic acids such as 1,4-dimethylbenzene-2,5-dihydroxamic acid and 1,3 - diethylbenzene-2,4-dihydroxamic acid; monoalkylbenzenedihydroxamic acids such as methylbenzenedihydroxamic acids, n-hexylbenzenedihydroxamic acids, and pentadecylbenzenedihydroxamic acids; 1-benzylbenzene-2,4-dihydroxamic acid; naphthalene-1,7-dihydroxamic acid; 1,2,3,4 - tetrahydronaphthalenedihydroxamic acids; 2,2 - diphenylpropane-p,p'-dihydroxamic acid; diphenylmethane-p,p'-dihydroxamic acid; anthracene-2,8-dihydroxamic acid; 1,2-diphenylethane-p, p'-dihydroxamic acid; biphenyldihydroxamic acids; 1,2-diphenylethane-o,o'-dihydroxamic acid; stilbene-p,p'-dihydroxamic acid; and stilbene-o,o'-dihydroxamic acid. Illustrative examples of aromatic di(nitrile carbonates) include those corresponding to the foregoing aromatic dihydroxamic acids, such as benzene-1,3-di(nitrile carbonate); benzene-1,4-di(nitrile carbonate); etc.

The nitrile carbonate can be recovered from solution by any desirable means, for instance by first filtering the reaction mixture to remove any unreacted hydroxamic acid starting materials, separating the organic layer from the aqueous layer, and drying the organic layer with a suitable drying agent such as, for example, anhydrous sodium sulfate. The organic layer can then be treated to remove the solvent and to provide the nitrile carbonate as a crude product. This separation is preferably made by evaporating the solvent under reduced pressure. The crude product, which can be either crystalline or liquid, depending on the particular nitrile carbonate prepared, may contain small amounts of impurities which are high in chlorine content. A purer product can be obtained by recrystallization techniques as, for instance, from a suitable solvent such as those suitable for use in the reaction, e.g., benzene, chloroform, and the like, or mixtures thereof.

Alternative to the aforementioned recrystallization technique, a convenient method for obtaining an essentially chlorine-free product is by extraction or washing with a hydrocarbon solvent. Various normally liquid hydrocarbon solvents, say of about 5 to 15 or more carbon atoms, can be used for the extraction, as, for instance, aromatic solvents such as benzene, xylenes, toluene, chlorobenzene and the like. A minimum amount of solvent to give this desired purity is usually employed in the extraction, the actual amount used being dependent upon the particular product being purified. If desired, a combination of both the recrystallization and extraction methods can be used to obtain essentially chlorine-free products. Thermal decomposition of the essentially chlorine-free dinitrile carbonate results in improved yields of purer isocyanate product, which is also essentially chlorine-free.

The products of the method of the present invention are valuable intermediates or precursors for the preparation of highly desired chemicals. For example, nitrile carbonates can be thermally decomposed to isocyanates, and diisocyanates have found extensive use in the preparation of high molecular weight polymers by their reaction with polymerizable organic compounds such as compounds with terminal, active hydroxy or amine groups. Polyurethanes, for instance, are commonly prepared by the reaction of diisocyanates and polybasic alcohols such as the glycols.

The following examples are illustrative of the present invention.

EXAMPLE I

To a solution of 44.5 g. (0.45 mole) of phosgene in 500 ml. of chloroform at about −10 to −12° C. there was added dropwise, with stirring, over a period of about one hour, 170 ml. of an aqueous solution containing 35.2 g. (0.185 mole, 92.3 percent purity) of butane-1,4-dihydroxamic acid and 32.0 g. (0.8 mole) of sodium hydroxide. The reaction appeared to be complete within a couple of minutes after termination of the addition. Some solids were precipitated during the reaction. Stirring was continued for an additional 15 minutes and the mixture was then heated to about 35° C., resulting in the dissolution of essentially all of the solids and the quenching via hydrolysis, of the unreacted phosgene. (Hydrolysis of phosgene is promoted by elevated temperatures and pH.) After addition of 500 ml. of water, the chloroform layer was separated from the aqueous layer and the former was then evaporated to dryness at room temperature under reduced pressure. The residue obtained amounted to 39 g. of crude butane-1,4-di(nitrile carbonate) having a melting point range of about 61 to 63° C., representing a yield of 92.6 percent. The infrared spectrum ("Nujol" mull) of the crude reaction product was determined; it showed two significant bands in the 5.35 to 5.50 micron region, characteristic of cyclic carbonates, and a significant band at 6.12 microns, characteristic of conjugated C=N stretching vibrations.

EXAMPLE II

To a solution of 41.5 g. (0.42 mole) of phosgene in 200 ml. of chloroform was added dropwise, with stirring, at temperatures in the range of —5 to 0° C., over a period of about 1.25 hours, 255 ml. of an aqueous solution containing the 39.4 g. (0.2 mole, 89.4 percent purity) of butane-1,4-dihydroxamic acid and 32.5 g. (0.8 mole, 98.5 percent purity) of sodium hydroxide. The reaction appeared to be complete within a couple of minutes after the addition was terminated. Some solids were precipitated during the reaction. The reaction mixture was stirred for an additional 30 minutes after completion of the addition and then allowed to warm to room temperature to permit the unreacted phosgene to be hydrolyzed. After addition of 200 ml. of chloroform, the pH of the reaction mixture was adjusted to a value in the range of 6 to 7 by addition of sodium bicarbonate so as to neutralize the HCl formed by the hydrolytic decomposition of the excess phosgene. The solids were filtered out of the reaction mixture and found to be primarily composed of unreacted butane-1,4-dihydroxamic acid. The chloroform layer of the filtrate was then separated from the aqueous layer and dried with anhydrous sodium sulfate. The dried chloroform layer was then evaporated to dryness at room temperature under reduced pressure. The residue obtained amounted to 29 g. of crude butane-1,4-di(nitrile carbonate) having a melting point of about 64° C., representing a yield of 63.6 percent.

EXAMPLE III

To a solution of 47.5 g. (0.48 mole) of phosgene in in 500 ml. of benzene was added dropwise, with stirring, at temperatures in the range of 5 to 6° C., over a period of about 45 minutes, 248 ml. of an aqueous solution of 39.4 g. (0.2 mole, 89.4 percent purity) of butane-1,4-dihydroxamic acid and 32.5 g. (0.8 mole, 98.5 percent purity) of sodium hydroxide. The reaction appeared to be complete within a few minutes after completion of the hydroxamic acid addition. Some solids were precipitated during the reaction. Stirring was continued for an additional 30 minutes and then the reaction mixture was warmed to room temperature to permit hydrolytic decomposition of unreacted phosgene, and the pH was adjusted to a value in the range of 6 to 7, by addition of sodium bicarbonate, to neutralize the HCl formed by hydrolysis of the phosgene. Filtration of the mixture and vacuum drying of the filter cake provided 23 g. of a white solid having a melting point range of 63.5–64.5° C. The infrared spectrum ("Nujol" mull) of this solid showed it to be primarily the desired product, butane-1,4-di(nitrile carbonate), with a trace of butane-1,4-dihydroxamic acid. The benzene layer was then separated from the aqueous layer in the filtrate, was dried and was then evaporated under reduced pressure to dryness to give an additional 14.5 g. of crude butane-1,4-di(nitrile carbonate) having a melting point range of 63–64° C. Identification was verified by infrared spectroscopy.

EXAMPLE IV

To a solution of 43.5 g. (0.44 mole) of phosgene in 500 ml. of chloroform was added dropwise, with stirring, at temperatures in the range of —5 to 0° C., over a period of about 30 minutes, 215 ml. of an aqueous solution containing 40.7 g. (0.2 mole, 96.5 percent purity) of benzene-1,3-dihydroxamic acid and 32.5 g. (0.8 mole, 98.5 percent purity) of sodium hydroxide. The reaction appeared to be complete within a few minutes after completion of the hydroxamic acid addition. Some solids were precipitated during the reaction. Stirring was continued for an additional thirty minutes, after which the mixture was warmed to room temperature and neutralized to a pH value in the range of 6 to 7 with sodium bicarbonate. The solids were filtered off and determined to be unreacted hydroxamic acid. The chloroform layer was then separated from the aqueous layer, dried with anhydrous sodium sulfate, and evaporated to dryness under reduced pressure. Crude benzene-1,3-di(nitrile carbonate) was obtained as the residue in the amount of 21 g. (42 percent yield) with a melting point range of 128–131° C. The crude product was recrystallized from benzene to give white needles having a melting point range of 130–131° C.

*Analysis.*—Calculated for $C_{10}H_5N_2O_6$: C, 48.40; H, 1.62; N, 11.29. Found: C, 48.44; H, 1.64; N, 12.1.

The infrared spectrum ("Nujol" mull) of the recrystallized material showed two absorption bands in the 5.35–5.50 micron region, characteristic of cyclic carbonates, and a significant band at 6.16 microns, characteristic of conjugated C=N stretching vibrations.

It is claimed:

1. In the method of preparing a cyclic di(nitrile carbonate) of the formula:

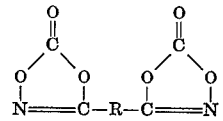

wherein R is hydrocarbon of 4 to 20 carbon atoms and at least 3 carbon atoms of R separate the two nitrile carbonate groups, by reacting phosgene with a dihydroxamic acid of the formula:

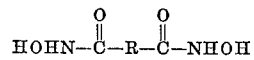

wherein R is as defined above, to yield the desired di(nitrile carbonate) and hydrogen chloride, the improvement wherein the reacting is conducted by adding gradually a reaction zone containing an agitated solution of phosgene in a water-immiscible, inert, organic solvent, said solvent being one in which the desired di(nitrile carbonate) product is soluble, a solution in water of the dihydroxamic acid and a basic material, said basic material being one which is non-reactive with the di(nitrile carbonate) and which is effective to neutralize the hydrogen chloride produced, the amount of said organic solvent employed being sufficient to maintain at least the major amount of the di(nitrile carbonate) product in solution in the reaction zone and the amount of said water employed being sufficient to maintain at least the major amount of the hydroxamic acid reactant in solution in the reaction zone, the molar amount of said organic solvent being at least as great as the molar amount of water employed, and the amount of said basic material employed being sufficient to maintain the pH of the solvent system within the range of about 1 to 8.

2. The improvement of claim 1 wherein the organic solvent has up to 8 carbon atoms and the basic material is sodium hydroxide.

3. The improvement of claim 2 wherein R is aliphatic and has 4 to 12 carbon atoms, and at least 4 carbon atoms of R separate the two carbonyl carbon atoms of the dihydroxamic acid.

4. The improvement of claim 1 in which the organic solvent is selected from the group consisting of benzene, chloroform and methylene chloride.

5. The improvement of claim 1 in which the amount of water employed is about 25 to 50 moles per mole of the dihydroxamic acid.

6. The improvement of claim 1 in which R has 4 to 12 carbon atoms and the two carbonyl carbon atoms of the dihydroxamic acid are separated from each other by at least 4 intervening carbon atoms.

7. The improvement of claim 6 in which the dihydroxamic acid reactant is butane-1,4-dihydroxamic acid and the basic material is sodium hydroxide.

8. The improvement of claim 1 in which R is an aliphatic hydrocarbon.

9. The improvement of claim 8 in which R is a saturated aliphatic hydrocarbon.

10. The improvement of claim 1 in which R is an aromatic hydrocarbon.

11. In the method of preparing a cyclic di(nitrile carbonate) of the formula:

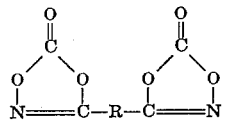

wherein R is an aliphatic, cycloaliphatic or aromatic hydrocarbon having 4 to 20 carbon atoms and at least 3 carbon atoms of R separate the two nitrile carbonate groups, by reacting phosgene with a dihydroxamic acid of the formula:

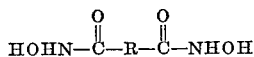

wherein R is as defined above, to yield the desired di(nitrile carbonate) and hydrogen chloride, the improvement wherein the reacting is conducted in an agitated dual solvent system consisting essentially of water-immiscible, inert, organic solvent in which phosgene and the di(nitrile carbonate) are soluble, water, and a water-soluble basic material which is non-reactive with the di(nitrile carbonate) and is effective to neutralize the hydrogen chloride produced, the amount of said organic solvent employed is 1 to 4 liters per each mole of the di(nitrile carbonate) produced, the amount of water employed is 25 to 50 moles per mole of the dihydroxamic acid, the amount of phosgene employed is at least stoichiometric, the phosgene is present in the organic solvent in a concentration not exceeding about 0.9 mole per liter of solvent, the reaction zone temperature is maintained in the range of about —20 to 50° C., and the amount of said basic material which is employed is sufficient to maintain the pH in the reaction zone in the range of about 6.5 to 7.5.

12. The improvement of claim 11 in which the organic solvent is selected from the group consisting of benzene, chloroform, and methylene chloride.

13. The improvement of claim 12 in which the dihydroxamic acid reactant is butane-1,4-dihydroxamic acid and the basic material is sodium hydroxide.

References Cited

UNITED STATES PATENTS

| | | | |
|---|---|---|---|
| 3,182,068 | 5/1965 | Sasse et al. | 260—306.7 |
| 3,480,595 | 11/1969 | Burk et al. | 260—77.5 |
| 3,335,131 | 8/1967 | Pizzarello et al. | 260—239 |

RAYMOND V. RUSH, Primary Examiner

U.S. Cl. X.R.

260—240 R, 240 E

UNITED STATES PATENT OFFICE
CERTIFICATE OF CORRECTION

Patent No. 3,825,554     Dated July 23, 1974

Inventor(s) E. H. Burk, Jr. and K. E. Fuger

It is certified that error appears in the above-identified patent and that said Letters Patent are hereby corrected as shown below:

Claim 1, line 16, after "ually" insert --to--.

Signed and sealed this 5th day of November 1974.

(SEAL)
Attest:

McCOY M. GIBSON JR.
Attesting Officer

C. MARSHALL DANN
Commissioner of Patents